(12) United States Patent
Hwang et al.

(10) Patent No.: US 9,472,113 B1
(45) Date of Patent: Oct. 18, 2016

(54) SYNCHRONIZING PLAYBACK OF DIGITAL CONTENT WITH PHYSICAL CONTENT

(71) Applicant: AUDIBLE, INC., Newark, NJ (US)

(72) Inventors: Douglas Cho Hwang, New York, NY (US); Guy Ashley Story, Jr., New York, NY (US)

(73) Assignee: AUDIBLE, INC., Newark, NJ (US)

( * ) Notice: Subject to any disclaimer, the term of this patent is extended or adjusted under 35 U.S.C. 154(b) by 409 days.

(21) Appl. No.: 13/759,901

(22) Filed: Feb. 5, 2013

(51) Int. Cl.
*G09B 5/00* (2006.01)
*G09B 5/06* (2006.01)

(52) U.S. Cl.
CPC .................................... *G09B 5/062* (2013.01)

(58) Field of Classification Search
USPC ........................................ 434/167, 169, 317
See application file for complete search history.

(56) References Cited

U.S. PATENT DOCUMENTS

| | | |
|---|---|---|
| 3,892,427 A | 7/1975 | Kraynak et al. |
| 5,203,705 A | 4/1993 | Hardy et al. |
| 5,351,189 A | 9/1994 | Doi et al. |
| 5,657,426 A | 8/1997 | Waters et al. |
| 5,737,489 A | 4/1998 | Chou et al. |
| 5,978,754 A | 11/1999 | Kumano |
| 6,208,956 B1 | 3/2001 | Motoyama |
| 6,356,922 B1 | 3/2002 | Schilit et al. |
| 6,544,040 B1 | 4/2003 | Brelis et al. |
| 6,638,171 B1 | 10/2003 | Igarashi et al. |
| 6,766,294 B2 | 7/2004 | MacGinite et al. |
| 6,865,533 B2 | 3/2005 | Addison et al. |
| 6,886,036 B1 | 4/2005 | Santamäki et al. |
| 6,912,505 B2 | 6/2005 | Linden et al. |
| 6,961,895 B1 | 11/2005 | Beran et al. |
| 7,003,515 B1 | 2/2006 | Glaser et al. |
| 7,107,533 B2 | 9/2006 | Duncan et al. |
| 7,210,102 B1 | 4/2007 | Gordon et al. |

(Continued)

FOREIGN PATENT DOCUMENTS

| | | |
|---|---|---|
| CN | 103988193 A | 8/2014 |
| EP | 2689342 | 1/2014 |

(Continued)

OTHER PUBLICATIONS

Beattie, et al., "Reading Assistant: Technology for Guided Oral Reading", Scientific Learning, Apr. 10, 2012, 5 pages.

(Continued)

*Primary Examiner* — Kesha Frisby
(74) *Attorney, Agent, or Firm* — Knobbe Martens Olson & Bear LLP

(57) ABSTRACT

A computing device may provide a visual cue to items of content (for example, words in a book) synchronized with the playback of companion content (for example, audio content corresponding to the book). For example, embodiments of the present disclosure are directed to a content playback synchronization system for use with physical books (or other physical media). In an embodiment, the computing device may display a visual cue (for example, an underline, box, dot, cursor, or the like) to identify a current location in textual content of the physical book corresponding to a current output position of companion audio content. As the audio content is presented (i.e., as it "plays back"), the highlight and/or visual cue may be advanced to maintain synchronization between the output position within the audio content and a corresponding position in the physical textual content.

24 Claims, 7 Drawing Sheets

(56) References Cited

U.S. PATENT DOCUMENTS

| | | |
|---|---|---|
| 7,231,351 B1 | 6/2007 | Griggs |
| 7,610,204 B2 | 10/2009 | Ruback et al. |
| 7,693,719 B2 | 4/2010 | Chu et al. |
| 7,849,043 B2 | 12/2010 | Woolf et al. |
| 7,925,993 B2 | 4/2011 | Williams |
| 8,106,285 B2 | 1/2012 | Gerl et al. |
| 8,109,765 B2 | 2/2012 | Beattie et al. |
| 8,131,545 B1 | 3/2012 | Moreno et al. |
| 8,131,865 B2 | 3/2012 | Rebaud et al. |
| 8,150,864 B2 | 4/2012 | Williams et al. |
| 8,317,606 B2 | 11/2012 | Graham et al. |
| 8,412,718 B1 | 4/2013 | Bilger |
| 8,442,423 B1 | 5/2013 | Ryan et al. |
| 8,452,797 B1 | 5/2013 | Paleja et al. |
| 8,512,042 B2 | 8/2013 | Rogan et al. |
| 8,515,737 B2 | 8/2013 | Allen |
| 8,517,738 B2 | 8/2013 | Sheehan et al. |
| 8,548,618 B1 | 10/2013 | Story, Jr. et al. |
| 8,577,668 B2 | 11/2013 | Rosart et al. |
| 8,849,676 B2 | 9/2014 | Goldstein et al. |
| 8,855,797 B2 | 10/2014 | Story, Jr. et al. |
| 8,862,255 B2 | 10/2014 | Story et al. |
| 2002/0002459 A1 | 1/2002 | Lewis et al. |
| 2002/0007349 A1 | 1/2002 | Yuen |
| 2002/0041692 A1 | 4/2002 | Seto et al. |
| 2002/0046023 A1 | 4/2002 | Fujii et al. |
| 2002/0116188 A1 | 8/2002 | Amir et al. |
| 2003/0023442 A1 | 1/2003 | Akabane et al. |
| 2003/0061028 A1 | 3/2003 | Dey et al. |
| 2003/0077559 A1 | 4/2003 | Braunberger et al. |
| 2003/0083885 A1 | 5/2003 | Frimpong-Ansah |
| 2003/0115289 A1 | 6/2003 | Chinn et al. |
| 2004/0078786 A1 | 4/2004 | Hoolahan et al. |
| 2004/0261093 A1 | 12/2004 | Rebaud et al. |
| 2005/0086211 A1 | 4/2005 | Mayer |
| 2005/0276570 A1 | 12/2005 | Reed et al. |
| 2006/0014129 A1 | 1/2006 | Coleman et al. |
| 2006/0064733 A1 | 3/2006 | Norton et al. |
| 2006/0111909 A1 | 5/2006 | Maes et al. |
| 2006/0112131 A1 | 5/2006 | Harrold et al. |
| 2006/0148569 A1 | 7/2006 | Beck |
| 2007/0005651 A1 | 1/2007 | Levien et al. |
| 2007/0016314 A1 | 1/2007 | Chan et al. |
| 2007/0061487 A1 | 3/2007 | Moore et al. |
| 2007/0074619 A1 | 4/2007 | Vergo |
| 2007/0118378 A1 | 5/2007 | Skuratovsky |
| 2007/0136459 A1 | 6/2007 | Roche et al. |
| 2007/0276657 A1 | 11/2007 | Gournay et al. |
| 2007/0281285 A1 | 12/2007 | Jayaweera |
| 2007/0282607 A1 | 12/2007 | Bond et al. |
| 2008/0039163 A1 | 2/2008 | Eronen et al. |
| 2008/0114601 A1 | 5/2008 | Boyle et al. |
| 2008/0120312 A1 | 5/2008 | Reed et al. |
| 2008/0141126 A1 | 6/2008 | Johnson et al. |
| 2008/0154593 A1 | 6/2008 | Da Palma et al. |
| 2008/0177822 A1 | 7/2008 | Yoneda |
| 2008/0189099 A1 | 8/2008 | Friedman et al. |
| 2008/0294453 A1 | 11/2008 | Baird-Smith et al. |
| 2008/0294782 A1 | 11/2008 | Patterson |
| 2009/0006096 A1 | 1/2009 | Li et al. |
| 2009/0006336 A1 | 1/2009 | Forstall et al. |
| 2009/0047003 A1 | 2/2009 | Yamamoto |
| 2009/0124272 A1 | 5/2009 | White et al. |
| 2009/0136213 A1 | 5/2009 | Calisa et al. |
| 2009/0165634 A1 | 7/2009 | Mahowald |
| 2009/0172543 A1 | 7/2009 | Cronin et al. |
| 2009/0210213 A1 | 8/2009 | Cannon et al. |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0282093 A1 | 11/2009 | Allard et al. |
| 2009/0298019 A1 | 12/2009 | Rogan et al. |
| 2009/0305203 A1 | 12/2009 | Okumura et al. |
| 2009/0319273 A1 | 12/2009 | Mitsui et al. |
| 2009/0326948 A1 | 12/2009 | Agarwal et al. |
| 2010/0042411 A1 | 2/2010 | Addessi et al. |
| 2010/0042682 A1 | 2/2010 | Kaye |
| 2010/0042702 A1 | 2/2010 | Hanses |
| 2010/0064218 A1 | 3/2010 | Bull et al. |
| 2010/0070575 A1 | 3/2010 | Bergquist et al. |
| 2010/0203970 A1 | 8/2010 | Hope |
| 2010/0211199 A1 | 8/2010 | Naik et al. |
| 2010/0218094 A1 | 8/2010 | Ofek et al. |
| 2010/0231537 A1 | 9/2010 | Pisula et al. |
| 2010/0279822 A1 | 11/2010 | Ford |
| 2010/0286979 A1 | 11/2010 | Zangvil et al. |
| 2010/0287256 A1 | 11/2010 | Neilio |
| 2011/0066438 A1 | 3/2011 | Lindahl et al. |
| 2011/0067082 A1 | 3/2011 | Walker |
| 2011/0067099 A1 | 3/2011 | Barton et al. |
| 2011/0087802 A1 | 4/2011 | Witriol et al. |
| 2011/0099392 A1 | 4/2011 | Conway |
| 2011/0119572 A1 | 5/2011 | Jang et al. |
| 2011/0153330 A1 | 6/2011 | Yazdani et al. |
| 2011/0173214 A1 | 7/2011 | Karim |
| 2011/0177481 A1 | 7/2011 | Haff et al. |
| 2011/0184738 A1 | 7/2011 | Kalisky et al. |
| 2011/0191105 A1 | 8/2011 | Spears |
| 2011/0231474 A1 | 9/2011 | Locker et al. |
| 2011/0246175 A1 | 10/2011 | Yi et al. |
| 2011/0246383 A1 | 10/2011 | Gibson et al. |
| 2011/0248959 A1 | 10/2011 | Diehl |
| 2011/0288861 A1 | 11/2011 | Kurzweil et al. |
| 2011/0288862 A1 | 11/2011 | Todic |
| 2011/0295843 A1 | 12/2011 | Ingrassia, Jr. et al. |
| 2011/0296287 A1 | 12/2011 | Shahraray et al. |
| 2012/0030288 A1 | 2/2012 | Burckart et al. |
| 2012/0054813 A1 | 3/2012 | Carmichael |
| 2012/0109640 A1 | 5/2012 | Anisimovich et al. |
| 2012/0150935 A1 | 6/2012 | Frick et al. |
| 2012/0158706 A1 | 6/2012 | Story, Jr. et al. |
| 2012/0166180 A1 | 6/2012 | Au |
| 2012/0191726 A1 | 7/2012 | Markus et al. |
| 2012/0197998 A1 | 8/2012 | Kessel et al. |
| 2012/0236201 A1 | 9/2012 | Larsen et al. |
| 2012/0245719 A1 | 9/2012 | Story, Jr. et al. |
| 2012/0245720 A1 | 9/2012 | Story, Jr. et al. |
| 2012/0245721 A1 | 9/2012 | Story, Jr. et al. |
| 2012/0246343 A1 | 9/2012 | Story, Jr. et al. |
| 2012/0310642 A1 | 12/2012 | Cao et al. |
| 2012/0311465 A1 | 12/2012 | Nealer et al. |
| 2012/0311625 A1 | 12/2012 | Nandi |
| 2012/0315009 A1 | 12/2012 | Evans et al. |
| 2012/0324324 A1 | 12/2012 | Hwang et al. |
| 2013/0013991 A1 | 1/2013 | Evans |
| 2013/0030853 A1 | 1/2013 | Agarwal et al. |
| 2013/0036140 A1 | 2/2013 | Bowes |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0090914 A1 | 4/2013 | White |
| 2013/0103814 A1 | 4/2013 | Carrasco et al. |
| 2013/0130216 A1 | 5/2013 | Morton et al. |
| 2013/0253833 A1 | 9/2013 | Tuukkanen |
| 2013/0257871 A1 | 10/2013 | Goldstein et al. |
| 2013/0262127 A1 | 10/2013 | Goldstein et al. |
| 2013/0268826 A1 | 10/2013 | Nowakowski et al. |
| 2013/0332167 A1 | 12/2013 | Kilgore |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0149867 A1 | 5/2014 | McCaddon et al. |
| 2014/0223272 A1 | 8/2014 | Arora et al. |
| 2014/0250219 A1 | 9/2014 | Hwang |

FOREIGN PATENT DOCUMENTS

| | | |
|---|---|---|
| EP | 2689346 | 1/2014 |
| JP | 2002-140085 | 5/2002 |
| JP | 2002-328949 | 11/2002 |
| JP | 2003-304511 | 10/2003 |
| JP | 2004-029324 | 1/2004 |

(56) References Cited

FOREIGN PATENT DOCUMENTS

| | | |
|---|---|---|
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 11/2012 |
| SG | 193537 | 10/2013 |
| SG | 193567 | 11/2013 |
| WO | WO 2006/029458 A1 | 3/2006 |
| WO | WO 2011/144617 | 11/2011 |
| WO | WO 2011/151500 | 12/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Dzik, U.S. Appl. No. 13/662,306, filed Oct. 26, 2012, entitled "Content Presentation Analysis."
Dzik, et al., U.S. Appl. No. 13/604,486, filed Sep. 5, 2012, entitled "Selecting Content Portions for Alignment."
Dzik, et al., U.S. Appl. No. 13/604,482, filed Sep. 5, 2012, entitled "Identifying Corresponding Regions of Content."
Goldstein et al., U.S. Appl. No. 13/535,260, filed Jun. 27, 2012, entitled "Conveying Questions With Content."
Goldstein et al., U.S. Appl. No. 13/434,538, filed Mar. 29, 2012, entitled "Content Customization."
Hwang, et al., U.S. Appl. No. 13/536,711, filed Jun. 28, 2012, entitled "Pacing Content."
Hwang, U.S. Appl. No. 13/465,853, filed May 7, 2012, entitled "Content Customization."
International Search Report issued for PCT/US12/30198 mailed on Jun. 20, 2012, 16 pages.
International Search Report re International Application No. PCT/US13/33935 mailed on Jul. 3, 2013.
Lester, U.S. Appl. No. 13/526,343, filed Jun. 18, 2012, entitled "Multiple Voices in Audio Content."
Levinson, S.E. et al., "Continuous Speech Recognition from a Phonetic Transcription", Acoustics, Speech, and Signal Processing, Apr. 1990, pp. 190-199.
Munroe, Randall, "My Hobby: Embedding NP-Complete Problems in Restaurant Orders," Jul. 9, 2007, http://xkcd.com/287.
Simonite, Tom, "Software Translates Your Voice into Another Language," Technology Review, Mar. 9, 2012, available at www.technologyreview.com/computing/39885/page1, last accessed Mar. 14, 2012.
"Speech Synthesis Markup Language," http://en.wikipedia.org/wiki/Speech_Synthesis_Markup_Language, last modified Feb. 12, 2011, last accessed Mar. 5, 2012.
"Speech Synthesis Markup Language," http://en.wikipedia.org/wiki/Speech_Synthesis, last modified Feb. 22, 2012, last accessed Mar. 5, 2012.
Story, Jr et al., U.S. Appl. No. 12/881,021, filed Sep. 13, 2010, entitled "Systems and Methods for Associating Stories With Related Referents."
Weber, U.S. Appl. No. 13/531,376, filed Jun. 22, 2012, entitled "Modelling Expected Errors for Discriminative Training."
Zhong, et al., "Energy Efficiency of Handheld Computer Interfaces: Limits, Characterization and Practice", MobiSys '05, Proceedings of the 3rd international conference on Mobile Systems, applications, and services, 2005, pp. 247-260.
Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.
Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.
Arar, Y., Blio E-Book Platform: No Reader (Yet), But Great Graphics, Jan. 7, 2010.
International Search Report issued in connection with International Patent Application No. PCTUS12/30186 mailed on Jun. 20, 2012, 12 pages.
International Preliminary Report on Patentability issued in connection with International Patent Application No. PCT/US12/30198 mailed on Jan. 30, 2014, 8 pages.
International Search Report and Written Opinion in PCT/US2013/042903 mailed Feb. 7, 2014.
International Search Report issued in connection with International Application No. PCT/US13/53020 mailed on Dec. 16, 2013.
International Search Report and Written Opinion in PCT/US2014/014508 mailed Jun. 25, 2014.
Vignoli, F., et al., A Text-Speech Synchronization Technique With Applications to Talking Heads, Auditory-Visual Speech Processing, ISCA Archive, Aug. 7-10, 1999.
Office Action in Japanese Application No. 2014-501257 dated Aug. 25, 2014.
Office Action in Japanese Application No. 2014-501254 dated Oct. 14, 2014.
International Search Report issued in connection with International Application No. PCT/US2013/39757 mailed on Oct. 29, 2013.
International Search Report issued in connection with International Application No. PCT/US2013/47866 mailed on Sep. 9, 2013.
International Preliminary Report on Patentability in . PCT/US2013/47866 mailed Jan. 8, 2015.
International Preliminary Report on Patentability in PCT/US2013/042903 mailed Dec. 11, 2014.
International Search Report and Written Opinion in PCT/US2014/52862 mailed Dec. 9, 2014.

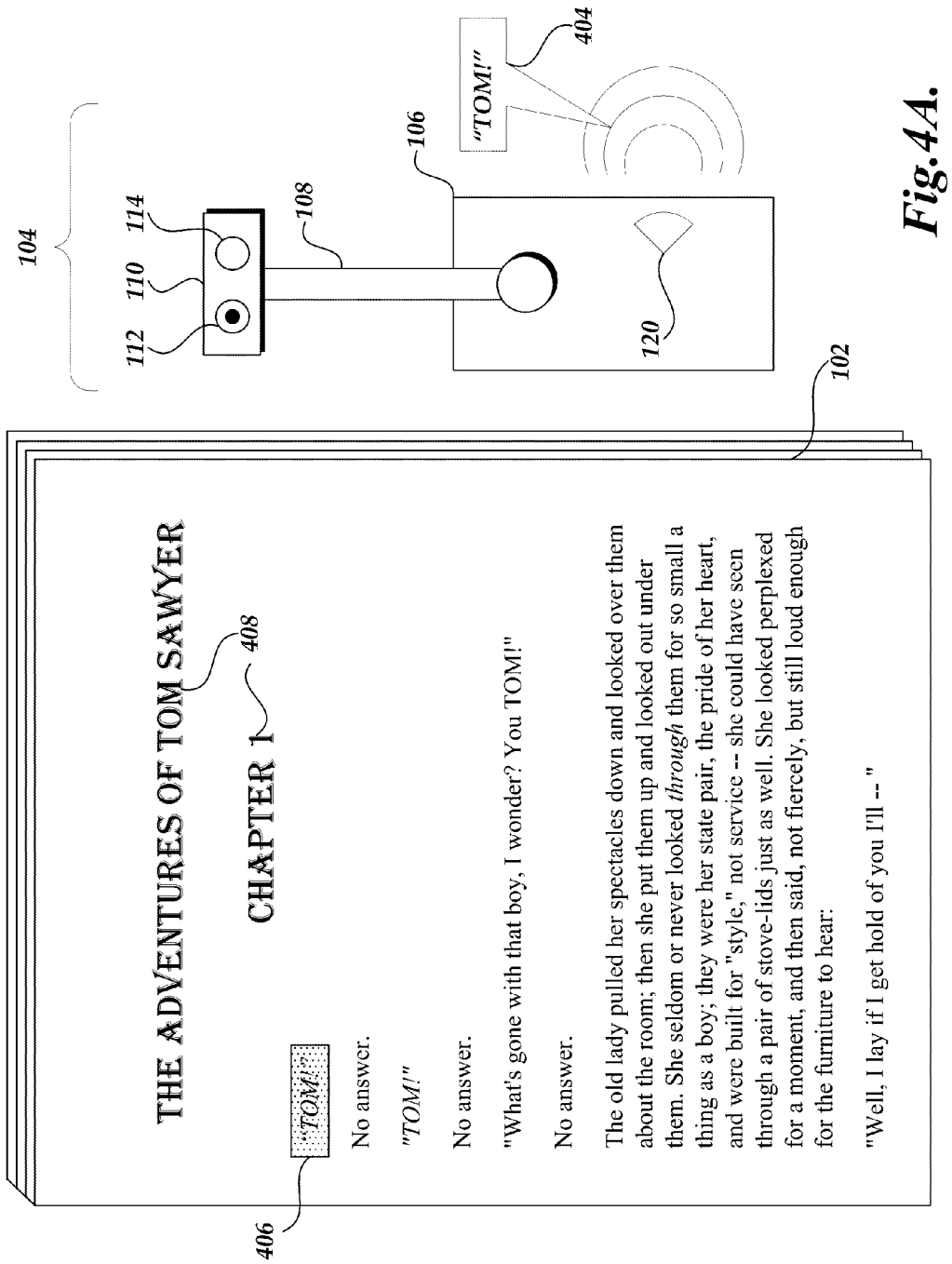

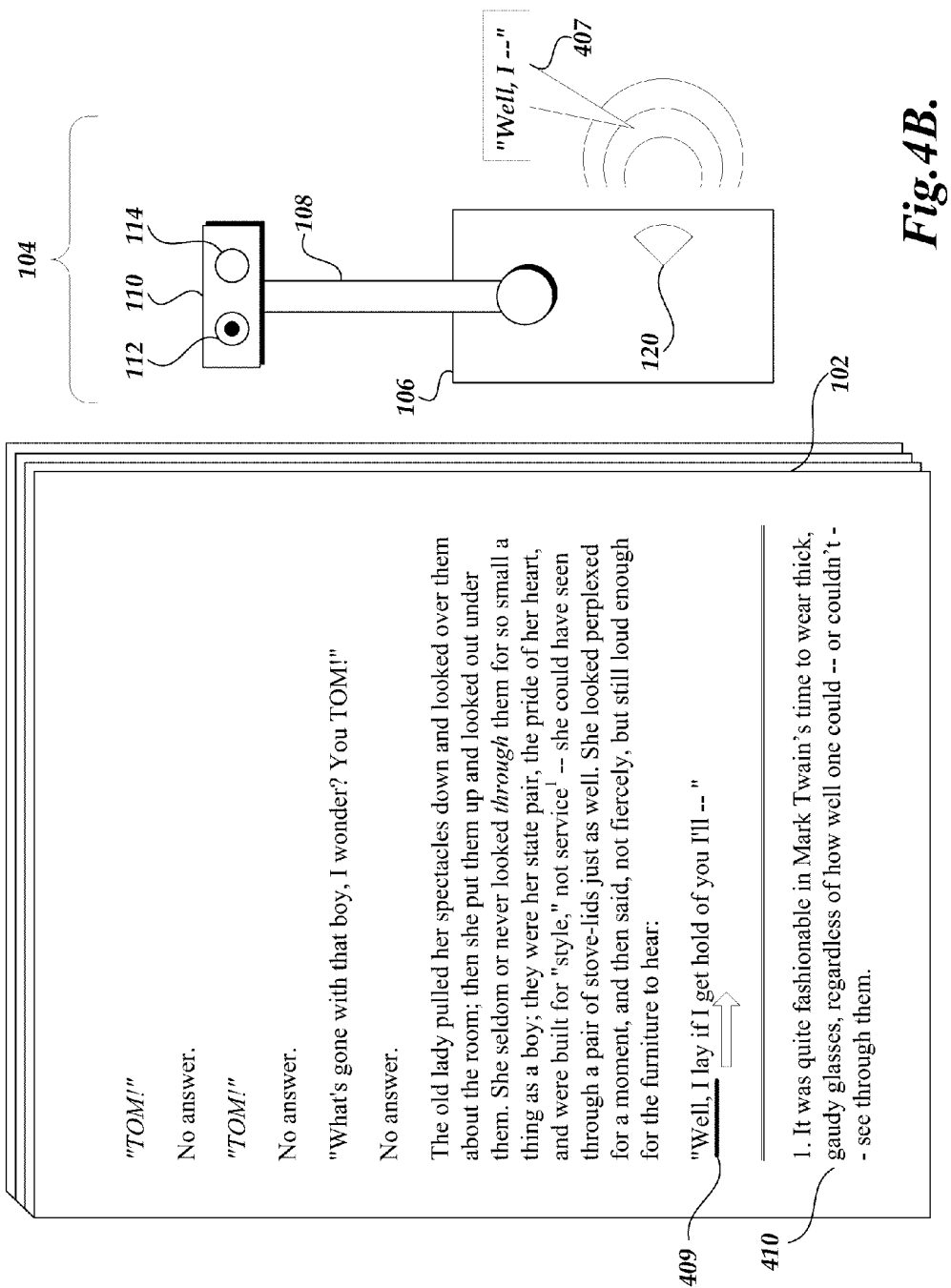

SYNCHRONIZING PLAYBACK OF DIGITAL CONTENT WITH PHYSICAL CONTENT

BACKGROUND

Generally described, user computing devices may facilitate the playback or display of items of content, such as audio books, electronic books, songs, videos, television programs, computer and video games, multi-media content, and the like. For example, an electronic audio player may play an audio book through speakers or headphones.

In some instances, a user may be interested in consuming multiple items of content at the same time. For example, a user may wish to read a physical book while listening to an audio book of the same title, such as *A Christmas Carol*. The physical book and the audio book (or more generally, any group of two or more items of content related to the same content title) may be referred to as "companion" or "corresponding" items of content.

However, in many current approaches, the user must manually line up the two companion items of content so that the words narrated in the audio book correspond to what the user is reading in the physical book. For example, the user may find it necessary to pause the audio book manually during portions of the physical book that have no counterpart in the audio book. Likewise, the user may find it necessary to manually fast-forward the audio book during portions of the audio book that have no counterpart in the physical book. Additionally, the user may find it necessary to search through the physical book to find the portion of the text that is currently being narrated in the audio book. This scheme may prove frustrating and inconvenient for users.

BRIEF DESCRIPTION OF THE DRAWINGS

The following aspects and many of the attendant advantages of the disclosure will become more readily appreciated as the same become better understood by reference to the following detailed description, when taken in conjunction with the accompanying drawings, wherein:

FIGS. 4A and 4B are pictorial diagrams of illustrative computing devices synchronously highlighting text in a physical book, according to embodiments of the present disclosure.

DETAILED DESCRIPTION

Figure 1:
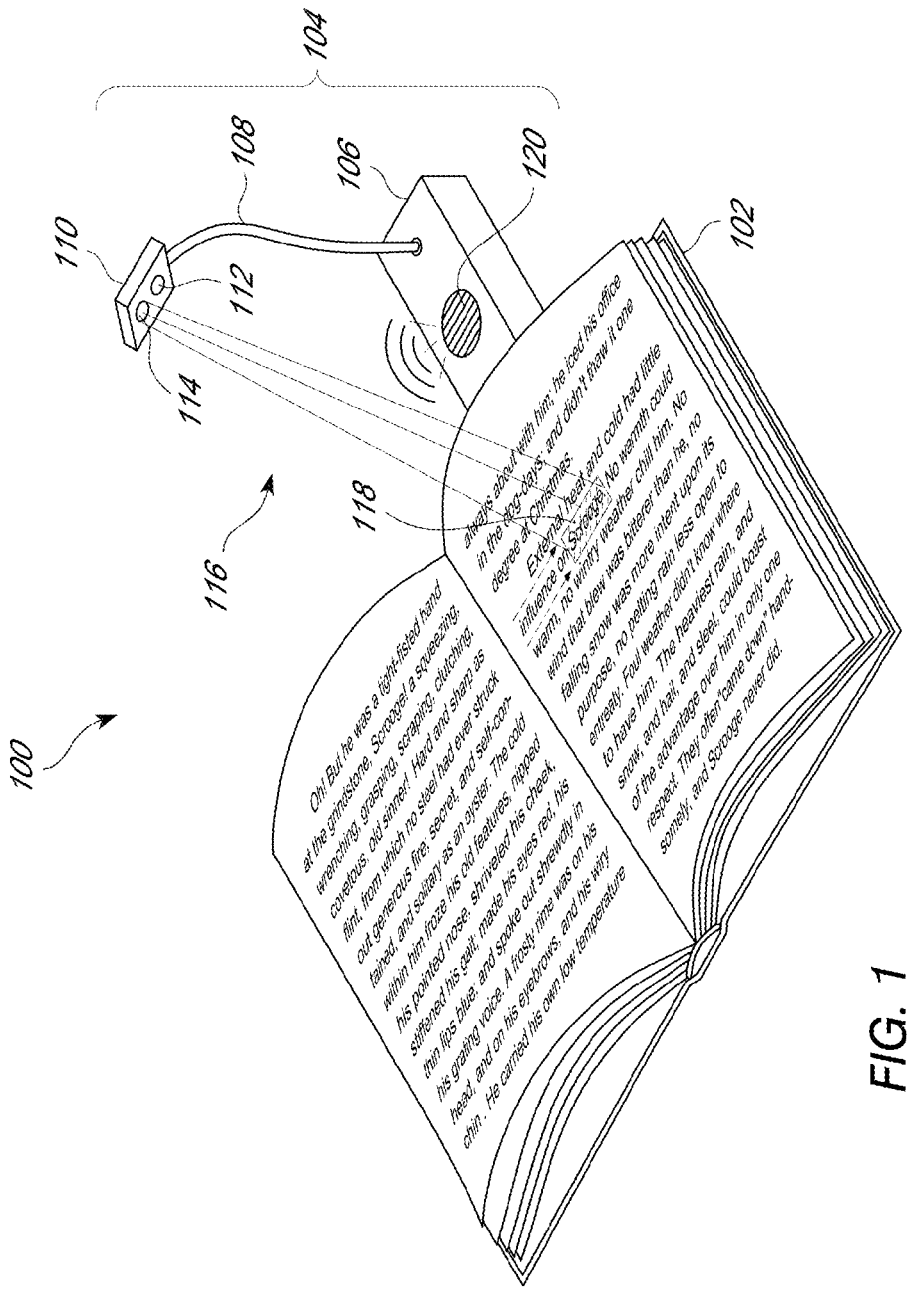
FIG. 1 is an example of a content playback synchronization system in operation, according to an embodiment of the present disclosure.

Generally described, aspects of the present disclosure relate to using a computing device to synchronize playback of an item of digital content with an item of physical content. More specifically, computer systems and methods are disclosed for providing a visual and/or tactile cue (also referred to herein as a "user perceptible cue") to an item of physical content that is synchronized to the playback of an item of companion and/or corresponding digital content. For example, embodiments of the present disclosure are directed to a content playback synchronization system for use with physical books (or other physical media) and companion audio books. The content playback synchronization system may include a synchronization device that generates a visual and/or tactile cue that identifies words in a physical book as corresponding words in the companion audio book are being audibly output by the computing device.

In one embodiment, the synchronization device is embodied in a reading light that may be positioned anywhere in relation to the physical book such that the words in the physical book are illuminated or highlighted by the light as the corresponding words in the companion audio book are output or played back. Accordingly, as the user listens to the words in the companion audio book being output by the computing device, the user simultaneously reads the corresponding words in the physical book that are synchronously illuminated or highlighted. When the end of a page in the physical book is reached, the synchronization device may pause and/or suspend playback of the companion audio book, and then resume playback of the audio book and synchronous illumination or highlighting of the physical book when the user turns to the next page of the physical book.

In addition to, or in lieu of, illuminating or highlighting the words or text of physical content during synchronous presentation with companion digital content, the synchronization device may provide other visual or tactile cues. For example, the synchronization device may include a laser that casts a point of light above, below, or on the relevant text. Alternatively, the laser may rapidly draw a box or circle around the text, draw a line under the text, etc. In another embodiment, the synchronization device may include a light or focusable spotlight that may illuminate the relevant text on the page, e.g., in a circle, box or other shape. The synchronization device may also identify successive items of physical content in animated fashion through, for example, changing laser or illumination colors, and/or increasing or decreasing the intensity of illumination or highlighting, among others. In another embodiment, the synchronization device or a portion thereof may be placed beneath, adjacent to, or above the page of a physical book and produce tactile cues (e.g., via electrical pulses, thermopneumatic actuators, etc.) in Braille or other tactile codes perceptible by the user during synchronous presentation of the companion digital content. Alternatively, any combination of the foregoing may be used.

The illuminated or otherwise identified physical content may include any number of, for example, words, letters, syllables, phonemes, morphemes, spaces, sentences, paragraphs, columns, lines, rows, chapters, stanzas, sections, or other natural or predefined visual or textual feature of the physical content. Further, the synchronization device is not limited to identifying text, but may identify other aspects of physical content as well, e.g., images, pictures, equations, tables, and/or bullets, etc. Multiple aspects of physical content (e.g., multiple words at different locations on a page, or an image and words, etc.) may be simultaneously identified by the synchronization device. Those skilled in the art will recognize a myriad of other visual and/or tactile cues for identifying physical content that fall within the spirit and scope of the present disclosure.

As the digital content is presented, the visual and/or tactile cue may be advanced to maintain synchronization between an output position within the digital content and a corresponding position in the physical content. The position in the physical content corresponding to the advancing output position of the digital content may be referred to herein as the advancing position in the physical content. In some embodiments, detection information and/or synchronization information defining the corresponding and advancing positions in the digital content and the physical content is provided to the synchronization device by a remote source, such as a remote content detection and alignment server or other content management system. An embodiment of a system for generating synchronization information for companion content may be found in U.S. Patent Publication No. 2012/0324324 ("the '324 Publication"), published Dec. 20, 2012, entitled "SYNCHRONIZING RECORDED AUDIO CONTENT AND COMPANION CONTENT," which is hereby incorporated by reference in its entirety.

The content detection information and/or synchronization information may include any data related to the synchronous presentation of the physical content (for example, the generation of the visual and/or tactile cue on the physical book) and the companion digital content (for example, the playback of the audio content), so as to enable one or more computing devices to synchronously present the companion content. Content detection information and/or synchronization information may include reference points mapping portions of the physical content to corresponding portions of the digital content, or vice versa. In a specific example, content detection and/or synchronization information may include data that can be used to map a segment of text (for example, a word, line, sentence, etc.) to a timestamp of a corresponding audio recording. In another example, content detection information and/or synchronization information may include data concerning the location of text on pages of a physical book, such as spatial coordinates (this data being used for providing the visual cue). The content synchronization information may also include information related to the relative progress of the presentation, or a state of presentation of the digital content. The synchronous presentation of the companion content may vary as a function of the capabilities and/or configuration of the synchronization device and/or the formats of the content in the content pair. Accordingly, the content detection information and/or synchronization information may be generated in a variety of formats, versions, etc. In addition, the content synchronization information may include any combination of features or data used to synchronize content disclosed in the '324 Publication, U.S. Patent Publication No. 2012/0197998 ("the '998 Publication"), published Aug. 2, 2012, entitled "SYNCHRONIZATION OF DIGITAL CONTENT," U.S. patent application Ser. No. 13/604,482 ("the '483 application"), filed Sep. 5, 2012, entitled "IDENTIFYING CORRESPONDING REGIONS OF CONTENT," and U.S. Patent Publication No. 2012/0245720 ("the '720 Publication"), published Sep. 27, 2012, entitled "MANAGING PLAYBACK OF SYNCHRONIZED CONTENT," each of which is hereby incorporated by reference in its entirety. In the present disclosure, the terms "content detection information," "content synchronization information," and "synchronization information" may be used interchangeably, each referring to the same content detection information and/or synchronization information described above.

The synchronization device may be any computing device capable of illuminating or otherwise identifying physical content to a user while synchronously outputting companion or corresponding digital content. The computing device may include, but is not limited to, a dedicated device (such as a reading light with dedicated hardware and software components), a head mounted device (such as glasses with integrated electronics and/or augmented reality functionality), a handheld device (such as a tablet computer, personal digital assistant (PDA), hybrid PDA/mobile phone, mobile phone, smartphone, electronic book reader, or digital media player), a gaming device, and integrated component(s) for inclusion in another device, etc. These computing devices may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors, and the like.

The term "physical" as used in the present disclosure in conjunction with various types of content (for example, as used in the phrase "physical book"), may be understood to differentiate such content from electronic or digital content. For example, in some embodiments a "physical book" and/or "physical content" may be understood to refer primarily to what may also generally be referred to as a "print book" and/or "print content." Illustrative examples of physical content may include hardcover books, softcover books, print magazines, print newspapers, and the like. In addition, physical content should be understood to include any form of visual or tactile content, including text, images, charts, graphs, slides, maps, Braille, embossed images, or any other content capable of being displayed on a physical medium. However, "physical content" may also refer to digital content when presented on the display of a physical device. For example, the synchronization device described herein may be used in conjunction with a physical electronic book reader to illuminate or otherwise identify text in an electronic book being presented on an electronic paper display of the electronic book reader as the synchronization device synchronously outputs the companion audio book. In yet another embodiment, "physical content" may refer to digital content when presented on a display screen of the synchronization device itself.

In addition, digital or electronic content may refer to any content that can be directly or indirectly accessed by a user through any computing device, including, but not limited to, multi-media content, digital images, digital video, audio data (such as audio content), eBooks, electronic documents, electronic publications, computer-executable code, portions of the above, and the like. References to audio content should be understood to include any form of audio content, including audio books, songs, videos, television programs, computer and video games, multi-media content, or any other content having an audible component. Moreover, references to sequential content may include any content that can be output in a sequential manner, including an electronic book, image slideshow, presentation slides, displayable text, audio data, video data, and the like. Digital content may be stored on the synchronization device, may be generated by the synchronization device, or may be streamed across a network for display or output on the synchronization device. Moreover, digital content may be obtained from any of a number of sources, including a network content provider, a local data store, computer readable media, a content generation algorithm (for example, a text-to-speech algorithm) running remotely or locally, or through user input (for example, text entered by a user). For example, in one embodiment, the synchronization device may locally store the companion audio content of *A Christmas Carol* obtained from a local library or online store, or may stream the companion audio content of *A Christmas Carol* from a third party commercial audio book provider.

In an embodiment, the synchronization device may be used in conjunction with analog content. For example, the synchronization device may playback analog content in a manner similar to the playback of digital content as described herein. Examples of such analog content include magnetic tape sound recordings (such as recordings stored on compact cassettes), phonographic sound recordings, magnetic tape video recordings (such as videos stored on VHS tapes), motion pictures on film, and other magnetic and/or analog data recordings. Thus, references to digital content, audio content, companion content, and/or corresponding content in the present disclosure may be understood to include, in certain embodiments, analog content. In these embodiments, content detection information and/or synchronization information may include any data related to the synchronous presentation of physical content and the companion analog content. For example, content detection information and/or synchronization information may include time designations and/or reference points mapping portions of the physical content to corresponding portions of the analog content, or vice versa.

Illustratively, FIG. 1 shows an example content playback synchronization system 100 in operation, according to an embodiment of the present disclosure. The example content playback synchronization system 100 includes a physical book 102 and a synchronization device 104. The synchronization device 104 may include a base 106, an arm 108, a head 110, a camera 112, a light source 114, and a speaker 120. In the illustrated embodiment, the light source 114 shines a light 116 onto a page of the physical book 102 entitled *A Christmas Carol*, highlighting word "Scrooge" 118. The light source 114 may include a laser, spotlight, or other focusable light source. For example, the light source 114 may include a digital micromirror device, such as a DLP® chip. As for the speaker 120, the synchronization device 104 may include, in addition to or in place of, the speaker 120, other devices capable of producing audio output. For example, the synchronization device 104 may include one or more speakers or any of a variety of digital or analog audio capable output ports to other output devices, including, but not limited to, headphone jacks, ¼ inch jacks, XLR jacks, Bluetooth links, stereo jacks, RCA jacks, optical ports, USB ports, and the like.

In some embodiments, the synchronization device 104 may include additional components not explicitly shown in FIG. 1. For example, the synchronization device 104 may include electronic memory for storing processes, programs, modules, digital content, content detection information and/or synchronization information, and the like. In one embodiment, the synchronization device 104 may include a removable memory, such as a Secure Digital (SD) card, that may be used to transfer digital content, detection information, and/or synchronization information to and from the synchronization device 104. The synchronization device 104 may also include one or more processors for retrieving items of digital content, synchronizing presentation of digital content to physical content, and/or communicating with the camera 112, the light source 114, the speaker 120; and the like. The various components of the synchronization device 104 may communicate with each other, whether by wired, wireless, or some other type of communication. The synchronization device 104 may further include a communication interface for communicating with, for example, networks and/or other computing devices. For example, such communication interfaces may allow for communications via any wired network, wireless network or combination thereof, and may support communication via WiFi, Bluetooth, Radio Frequency (RF), USB, Near Field Communications (NFC), cellular, satellite or similar communication links. Protocols and components for communicating via the Internet or any of the other aforementioned types of communication links are well known to those skilled in the art of computer communications and thus, need not be described in more detail herein. Such communications devices may be used to retrieve items of audio content from, for example, remote servers, data stores, and the like.

The various components of the synchronization device 104, including the base 106, arm 108, head 110, camera 112, light source 114, and speaker 120, as well as the other components described above, may be arranged in any number of ways. For example, in an embodiment, all of the aforementioned components may be arranged in the same packaging or housing. In another embodiment, one or more of the components may or may not be physically connected to the other components. For example, the camera 112 and/or the light source 114 may be mounted on the user's head while maintaining wireless communication with processors and memory in the base 106 located near the physical book 102.

In an embodiment, the synchronization device 104 may be clipped and/or attached to the physical content (such as a physical book). In another embodiment, the synchronization device 104 may be packaged in a head mounted unit. For example, the synchronization device 104 may be included in glasses worn by the user. Other embodiments may include, for example, a wall or ceiling mounted device, a device embedded in a book, magazine, or other media, a device that stands on a table or desk, a chair mounted device, and the like. One skilled in the art will recognize many other configurations that fall within the scope and spirit of the present disclosure.

The user may utilize the synchronization device 104 to obtain an audio book version of, for example, *A Christmas Carol* at the same time, or at a different time, that the user obtains the physical book 102. The audio book may be stored locally on the synchronization device 104 or streamed to the synchronization device from a remote source. The synchronization device 104 may be placed near, and/or attached to the physical book 102. The camera 112 of the synchronization device 104 may then be used to obtain an image of the current page of the physical book 102. In one embodiment, the synchronization device 104 provides the page image to a remote content detection and alignment server (described below). The remote server may then process the page image to identify the content and generate content detection information and/or synchronization information for the physical book and companion audio book. The remote server may then provide the content detection information and/or synchronization information to the synchronization device 104. The synchronization device 104 may then output the audio book through the speaker 120, while the light source 114 simultaneously illuminates the corresponding content of the physical book 102 based on the content detection information and/or synchronization information. As the audio book is output, the light source 114 may direct the light 116 on successive, corresponding words on the page of the physical book 102, indicating the advancing position in the physical content. Thus, the synchronization device 104 may synchronously present the audio book with a visual cue identifying the corresponding content of the physical book 102. The process by which physical content is identified, companion digital content is retrieved, and presentation of physical and digital content is synchronized, is described in further detail below in reference to FIGS. 2, 3, 5, and 6.

Figure 2:
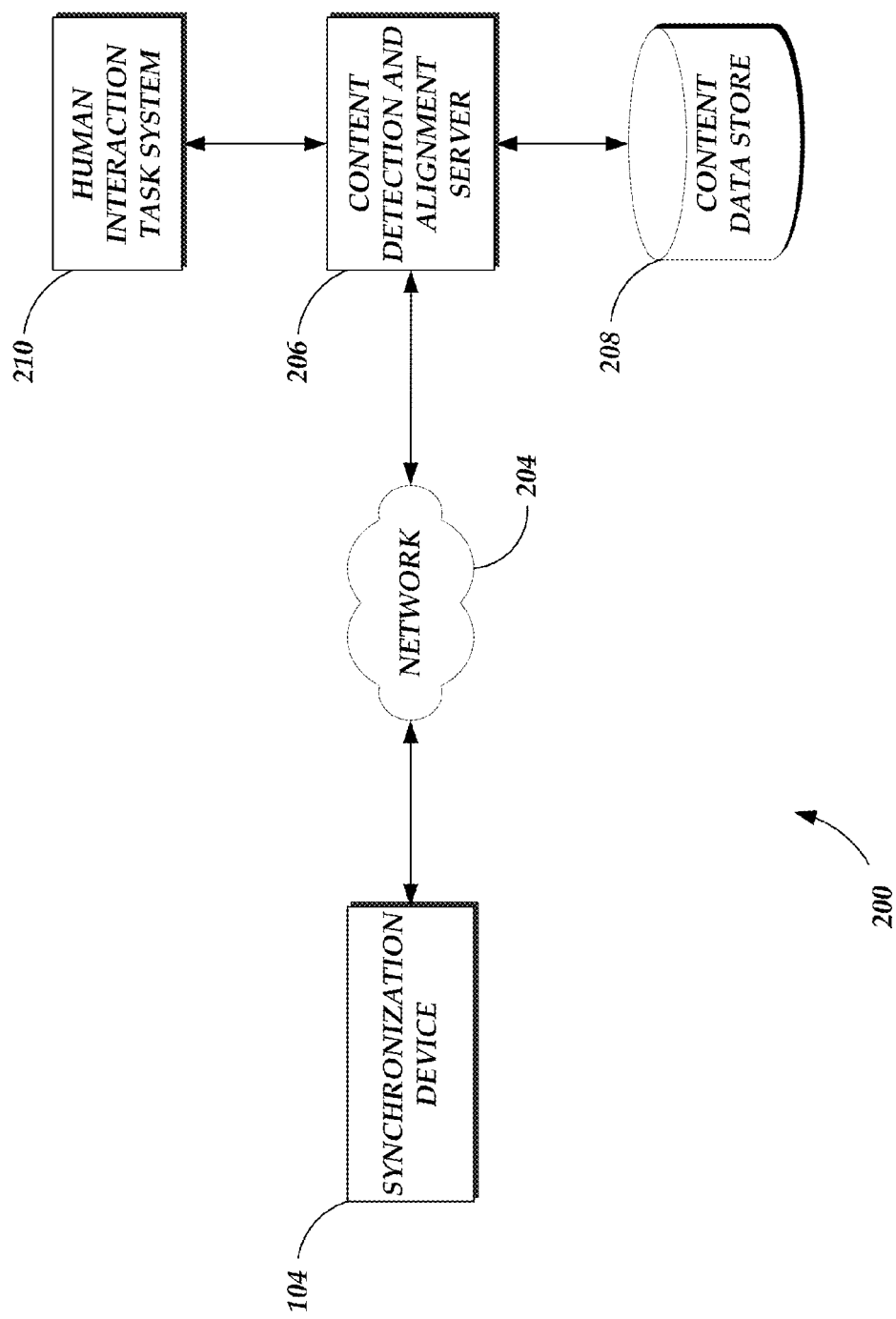
FIG. 2 is a block diagram of an illustrative network environment in which a content playback synchronization system may operate, according to an embodiment of the present disclosure.

Turning to FIG. 2, an illustrative network environment 200 in which the content playback synchronization system may operate according to an embodiment of the present disclosure is shown. The network environment 200 may include a synchronization device 104, a network 204, a human interaction system 210, a content detection and alignment server 206, and a content data store 208. The constituents of the network environment 200 may be in communication with each other either locally or over the network 204.

As noted above, the synchronization device 104 may be any computing device capable of illuminating or otherwise identifying physical content to a user while synchronously outputting companion digital content. The synchronization device 104 may also be capable of communicating over the network 204, for example, to request content synchronization and/or detection information from the content detection and alignment server 206. In some embodiments, the synchronization device 104 may include non-transitory computer-readable medium storage for storing content detection and synchronization information and items of content, such as electronic books and audio books. In an embodiment, the content playback synchronization system may include a plurality of synchronization devices, each of which may communicate with each other, and with the network 204.

The network 204 may be any wired network, wireless network, or combination thereof. In addition, the network 204 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The content detection and alignment server 206 is a computing device that may perform a variety of tasks to implement the content detection and alignment of the content playback synchronization system. For example, the content detection and alignment server 206 may align an item of audio content (e.g., an audio book) and an item of textual content (e.g., a physical book) and generate synchronization information therefrom. The content detection and alignment server 206 may also detect the contents of a page of content, identify the content source, and generate detection information therefrom. This detection and synchronization information may be provided by the content detection and alignment server 206 to the synchronization device 104 over the network 204. Additional operations of the content detection and alignment server 206 are described in further detail with respect to FIG. 3.

The human interaction task system 210 may be included in the network environment 200 to assist the content detection and alignment server 206. Generally described, the human interaction task system 210 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 210 might request a human worker to perform a HIT, e.g., for gathering information or answering a query, and to return the results or answers to the human interaction task system 210 for further processing and/or presentation to the requestor. Thus, in some embodiments, the content detection and alignment server 206 directs the human interaction task system 210 to pose one or more queries about an item of content to a human worker of the human interaction task system 210. For example, a human worker may be asked to compare a transcription of an item of audio content to an item of textual content, or to identify portion boundaries in the item of textual content, such as sentences or paragraphs. The human worker may also be asked to identify or classify front matter, back matter, footnotes, diagrams, tables, graphs, and body text in an item of textual content. The human interaction task system 210 may receive answers to these queries and transmit them to the synchronization device 104 or the content detection and alignment server 206 to guide the operation of the content alignment and detection. The human worker of the human interaction task system 210 may volunteer to respond to these and other tasks and to communicate other information about the item of content to the content detection and alignment server 206.

The content detection and alignment server 206 may be in communication with the content data store 208. The content data store 208 may store one or more items of content, such as, but not limited to, items of audio content (e.g., audio books), items of textual content (e.g., books or other textual content, and/or detected pages of physical books and electronic books), or other items of content. The content data store 208 may also be configured to store synchronization and detection information generated or obtained by the content detection and alignment server 206. The content data store 208 may be embodied in hard disk drives, solid state memories, and/or any other type of non-transitory, computer-readable storage medium remotely or locally accessible to the content detection and alignment server 206. The content data store 208 may also be distributed or partitioned across multiple storage devices as is known in the art without departing from the spirit and scope of the present disclosure.

Figure 3:
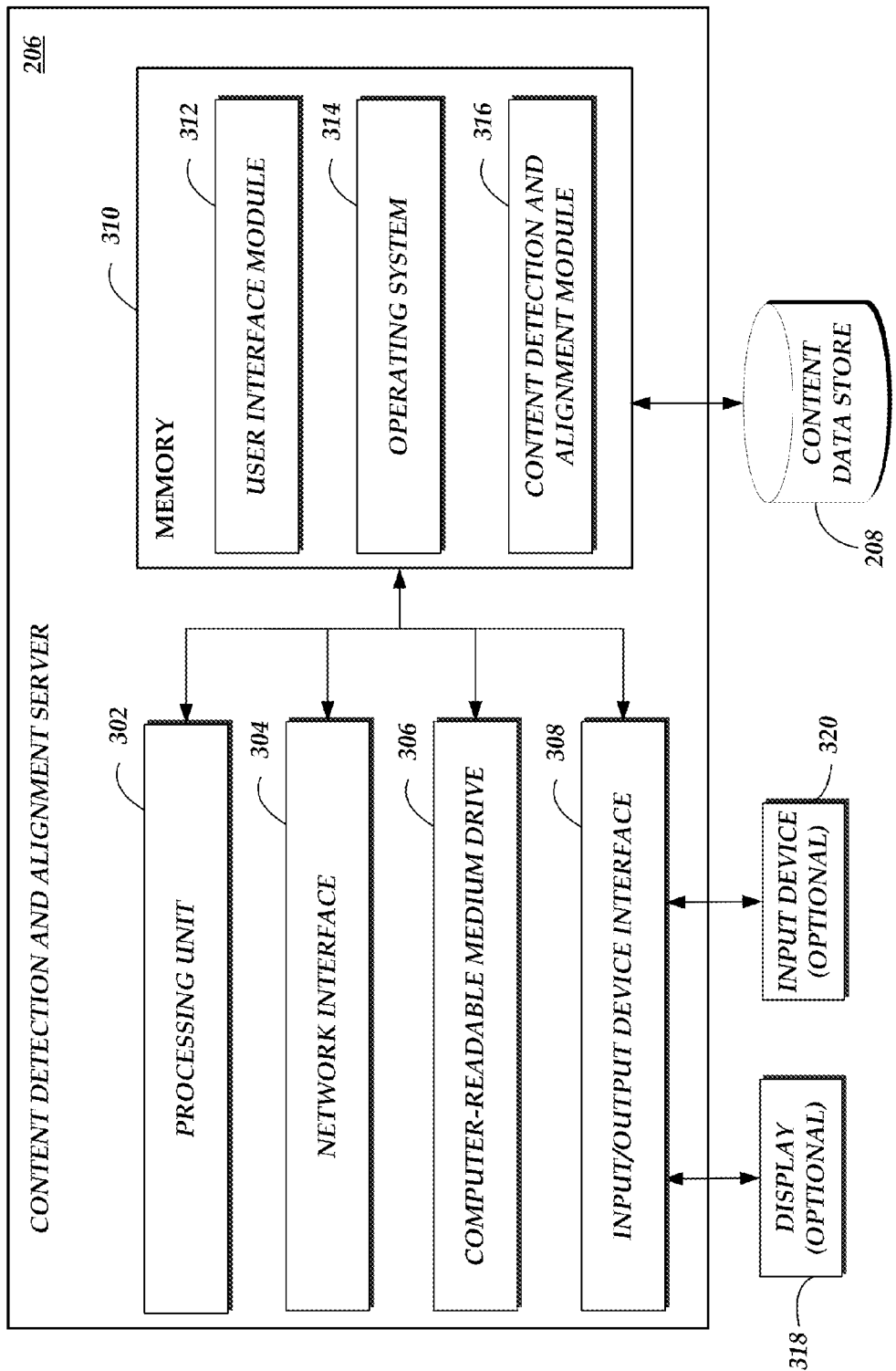
FIG. 3 is a block diagram of an illustrative content detection and alignment server, according to an embodiment of the present disclosure.

FIG. 3 shows a illustrative block diagram of the content detection and alignment server 206, according to an embodiment of the present disclosure. The content detection and alignment server 206 may include an arrangement of computer hardware and software elements that may be used to implement content detection and alignment. FIG. 3 depicts a general architecture of the content detection and alignment server 206 illustrated in FIG. 2. Those skilled in the art will appreciate that the content detection and alignment server 206 may include more (or fewer) components than those shown in FIG. 3. It is not necessary, however, that all of these generally conventional components be shown in order to provide an enabling disclosure.

The content detection and alignment server 206 includes a processing unit 302, a network interface 304, a non-transitory computer-readable medium drive 306, an input/output device interface 308, and a memory 310, all of which may communicate with one another by way of a communication bus. As illustrated, the content detection and alignment server 206 is optionally associated with, or in communication with, an optional display 318 and an optional input device 320. The optional display 318 and optional input device 320 may be used in embodiments in which users interact directly with the content server 206, such as an integrated in-store kiosk or integrated component for inclusion in an automobile, boat, train, or airplane, for example. In other embodiments, the optional display 318 and optional input device 320 may be included in the synchronization device 104 shown in FIG. 2. The network interface 304 may provide content detection and alignment server 206 with connectivity to one or more networks or computing systems. The processing unit 302 may also receive information and instructions from other computing systems (such as the synchronization device 104) or services via a network. The processing unit 302 may also communicate to and from memory 310 and further provide output information for the optional display 318 via the input/output device interface 308. The input/output device interface 308 may accept input from the optional input device 320, such as a keyboard, mouse, digital pen, touch screen, or gestures recorded via motion capture. The input/output device interface 308 may also output audio data to speakers or headphones (not shown).

The memory 310 contains computer program instructions that the processing unit 302 executes in order to implement one or more embodiments of the content playback synchronization system. The memory 310 generally includes RAM, ROM and/or other persistent or non-transitory computer-readable storage media. The memory 310 may store an operating system 314 that provides computer program instructions for use by the processing unit 302 in the general administration and operation of the content detection and alignment server 206. The memory 310 may further include other information for implementing aspects of the content playback synchronization system. For example, in one embodiment, the memory 310 includes a user interface module 312 that facilitates generation of user interfaces (such as by providing instructions therefor) for display upon a computing device such as the synchronization device 104. For example, a user interface may be displayed via a navigation interface such as a web browser installed on a synchronization device 104. In addition, memory 310 may include or communicate with the content data store 208. Content stored in the content data store 208 may include various types of items of content as described with respect to FIG. 2.

In addition to the user interface module 312, the memory 310 may include a content detection and alignment module 316 that may be executed by the processing unit 302. In one embodiment, the content detection and alignment module 316 may be used to implement the content detection and alignment, example operations of which are discussed below and with respect to FIGS. 5 and 6.

Those skilled in the art will recognize that in some embodiments, the content detection and alignment is implemented partially or entirely by the synchronization device 104. Accordingly, the synchronization device 104 may include a content detection and alignment module 316 and other components that operate similarly to the components illustrated as part of the content detection and alignment server 206, including a processing unit 302, network interface 304, non-transitory computer-readable medium drive 306, input/output interface 308, memory 310, user interface module 312, and so forth.

It will be recognized that many of the devices described herein are optional and that embodiments of network environment 200 may or may not combine devices. Moreover, the synchronization device 104 and/or content detection and alignment server 206 may each be embodied in a plurality of devices, each executing an instance of the respective synchronization device 104 and content detection and alignment server 206. However, devices need not be distinct or discrete. Devices may also be reorganized in the environment 200. For example, the content detection and alignment server 206 may be represented in a single physical server or, alternatively, may be split into multiple physical servers. The entirety of the functions of the content detection and alignment server 206 may be represented in a single synchronization device 104 as well. Additionally, it should be noted that in some embodiments, the functionality of the content detection and alignment server 206 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As discussed above, an image of physical content (such as a book page) may be analyzed to detect the contents of the page, to identify the source of the content, and/or to determine the location of the content on the page. Additionally an item of physical content and an item of digital content (such as an audio book) may be analyzed to determine which portions of the item of physical content substantially match or correspond to portions of the item of digital content. Content detection and synchronization information may be generated that reflects correspondences between portions of the item of digital content and portions of the item of physical content, as well as the locations of physical content. The '324 Publication, the '998 Publication, the '483 application, and the '720 Publication, each of which has been incorporated by reference herein, describe illustrative systems, processes, routines, and/or methods for identifying words in an item textual, physical content that correspond to words in the item of audio content (e.g., words in the textual content that are audibly presented in the item of audio content). These illustrative systems, processes, routines, and/or methods for content detection and alignment may be carried out, for example, in the content detection and alignment module 316 by the content detection and alignment server 206. Additionally, as will be described further below in reference to FIGS. 5 and 6, the content detection and alignment module 316 may include systems, processes, routines, and/or methods for detecting the locations of text on a page, detecting page numbers, and/or identifying content (for example, identifying the title of a book based on a picture of its cover, or the textual contents of a page). Illustrative systems, processes, routines, and/or methods for accomplishing these tasks are described in U.S. Pat. No. 8,150,864 ("the '864 patent"), issued Apr. 3, 2012, entitled "AUTOMATED MONITORING AND CONTROL OF ACCESS TO CONTENT FROM A SOURCE," and U.S. Pat. No. 7,210,102 ("the '102 patent"), issued Apr. 24, 2007, entitled "METHOD AND SYSTEM FOR DETERMINING PAGE NUMBERS OF PAGE IMAGES," each of which is hereby incorporated by reference in its entirety.

Turning to FIGS. 4A and 4B, examples of a synchronization device highlighting text in a physical book 102 while synchronously outputting a companion audio book are illustrated. As described above with respect to FIG. 1, the synchronization device 104 includes the base 106, the arm 108, the head 110, the camera 112, the light source 114, and the speaker 120. Audio content 404 and 407 are produced by the speaker 120. The physical book 102 includes front matter 408, and footnote 410. Visual cue indicators 406 and 409 are produced on the pages of the physical book 102 by the light source 114. As illustrated in FIGS. 4A and 4B, in which identical reference numbers refer to similar or identical elements, the synchronization device 104 generates visual cues 406 and 409 on text of the physical book 102 using the light source 114, here, *The Adventures of Tom*

Sawyer. The synchronization device 104 may also aurally present the companion audio book synchronously via one or more speakers 120 and/or one or more audio outputs, which may be provided to speakers or headphones. Content synchronization information may be used to synchronously present and update the presentation position of both the audio book content and the visual cues 406 and 409 in the physical book. This may include, for example, any combination of features described in reference to the illustrative routines of FIGS. 5 and 6 described below.

Additionally, content detection information may be used by the synchronization device 104 to determine where the light source 114 should be directed so as to synchronize the visual cues 406 and 409 with playback of the audio content. In an embodiment, detection information includes the spatial coordinate locations of some or all of the words on the current page of the physical book 102. Thus, visual cues 406 and 409 that are generated by the light source 114 may be directed to the correct position on the page using detection information.

As described above, the visual cues 406 and 409 may indicate a presentation position of the audio book content in relation to the corresponding position in the physical book. Accordingly, the corresponding text of the physical book 102 may be illuminated or otherwise identified to indicate the presentation position of the audio book being played back via the speaker 120. In this regard, text may be highlighted, boxed (as with indicator 406), underlined (as with indicator 409), or the like. As noted above, individual words, lines, sentences, and/or other units of text, as well as images, graphs, bullets, etc., may be synchronously illuminated or otherwise identified by visual or tactile cues during playback of the companion audio book. In one embodiment, when playback of the audio book reaches the end of a page of the physical book being presented, playback of the audio book may be paused or suspended. The synchronization device 104 may then detect a page turn of the physical book 102 with the camera 112 or other sensor, and then continue with playback of the companion audio book. Alternatively, the synchronization device 104 may prompt the user to turn the page of the book 102. In other embodiments, the synchronization device 104 provides a mechanism for automatically turning the page of the physical book 102, such as an actuating arm, among other possibilities known to one having skill in the art.

In some embodiments, a user may select any page of the physical book 102 and start playback at a corresponding point in the companion audio book. For example, the user may navigate to a point in time in the audio book using user controls associated with the synchronization device 104 (not shown), and the corresponding page number of the physical book 102 may be displayed to the user by the synchronization device 104. For instance, a light source having a laser may illuminate the page number in the margin of the book or the synchronization device 104 may notify the user aurally of the page number.

Turning specifically to FIG. 4A, the page of physical content may include front matter 408. As described in the '483 application, front matter is infrequently narrated in audio content and thus a portion mismatch for the front matter 408 may be indicated in the content synchronization information. Thus, the synchronization device 104 may begin output of the companion audio book 404 starting from a presentation position corresponding to the first word of the physical content that corresponds to the first word narrated in the audio book. For instance, in the illustrated example, the words of the front matter 408, "The Adventures of Tom Sawyer: Chapter 1" are unlikely to be narrated in the companion audio book 404. However, the first word of the physical book 102 belongs to a portion of the physical content that corresponds to a portion 404 of the audio book: "TOM!" Accordingly, the portion "TOM!" may be identified with a visual cue 406 as the word "TOM!" from the corresponding position in the audio book is output via the speaker 120. Other portion mismatches may be provided for in a similar manner as described in the '483 application, previously incorporated by reference herein.

Turning specifically to FIG. 4B, the page of the physical book 102 being presented may include a footnote 410. It is likely that no portion of the companion audio book corresponds to the footnote 410. Accordingly, a portion mismatch for the footnote 410 may be indicated in the content synchronization information provided to the synchronization device 104. Thus, as the portion 407 of the companion audio book is presented synchronously with visual cue 409 identifying the last line of the page, the user may be prompted to perform a page turn to the next page of the physical book 102, and/or play back of the audio book may be suspended, after the last word of the corresponding portion of audio content 407 is presented. The user may then take this opportunity to read the footnote 410, but without being provided the corresponding audio or a visual cue. Thus, synchronous presentation of the companion audio book and the visual cue to the physical book 102 may be maintained and the next portion of the audio content is not presented while a visual cue is being applied to the mismatching footnote 410. Alternately, audio content corresponding to footnote 410 may be available, and the user may be given the option listen to that footnote audio content synchronous with the presentation of the visual cue to the footnote 410. As another alternative, presentation of the companion audio book may stop after the last corresponding portion of the audio content on the page is output, and resume when a portion of the physical book 102 that corresponds to a portion of the audio book is next detected (e.g., after the user turns to a page in which a corresponding portion of the physical book 102 is present).

Figure 5:
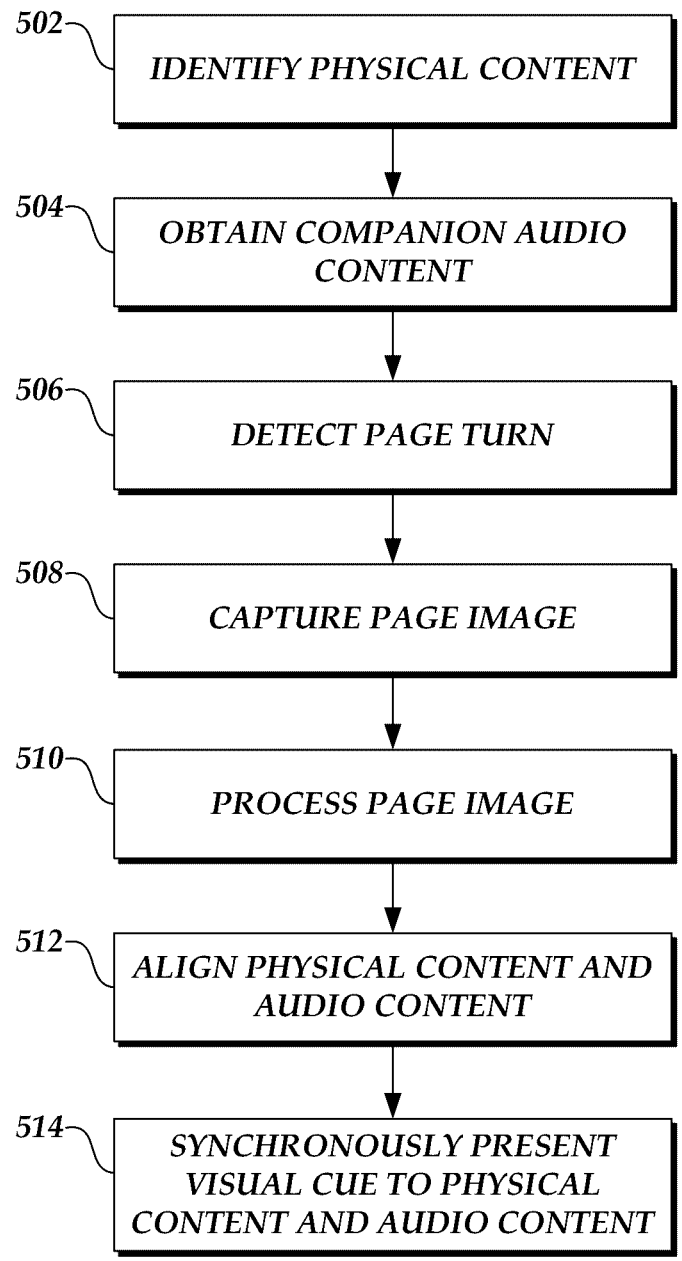
FIG. 5 is a flow diagram depicting an illustrative operation of the content playback synchronization system, according to an embodiment of the present disclosure.

FIG. 5 is a flow diagram depicting an illustrative operation of the content playback synchronization system, according to an embodiment of the present disclosure. The illustrative operation of FIG. 5 may be carried out by, for example, execution of the content detection and alignment module 316 by the content detection and alignment server 206 and/or the synchronization device 104. Alternatively, the operation may be carried out by both the content detection and alignment server 206 and the synchronization device 104, or by another device of the content playback synchronization system, or a combination of devices.

The illustrative operation begins at block 502 in which the physical content to be synchronized is identified. In the instance of a book, the title, author, ISBN, and/or specific edition of the book may be identified. In one embodiment, the physical content is identified by taking an image with the camera 112 of the cover, title page, copyright page, current page, etc. of the physical book 102. The image may then be sent to the content detection and alignment server 206, where the content detection and alignment module 316 may detect the words, pictures, numbers, or any other content in the image through, for example, optical character recognition (OCR). Examples of routines, processes, and methods used to accomplish content detection are disclosed in the '483 application, the '864 patent, and the '102 patent, each of which was previously incorporated by reference.

Content detection may be associated with a confidence level for correct detection. Detected content with a confidence level below a certain threshold may be sent to the human interaction task system 210 for further identification and/or confirmation of identification of the physical content. For example, some or all of the physical content (or a copy thereof) may be presented to a human worker of the human interaction task system. A question may also be presented to the human worker, such as "please identify the title of the content." The human worker may interact with a computing device of the human interaction task system to indicate the title of the physical content, and the results may be routed to the content detection and alignment module 316 for use in identifying the companion (or corresponding) audio content for the physical content.

At block 504, audio content corresponding to the identified physical content is obtained from the content data store 208. The obtained companion audio content may then be transmitted to the synchronization device 104. Additionally, synchronization information related to the companion audio content may be transmitted to the synchronization device 104. Examples of systems, routines, processes, and/or methods used to obtain synchronization information are disclosed in the '483 application, the '324 Publication, and the '720 Publication, each of which was previously incorporated by reference.

At this point, the physical content to be read (e.g., the title of the physical book) has been identified, and the companion audio content (e.g., a corresponding audio book of the same title) has been retrieved. In the event that the physical content has no corresponding audio content, the user may be notified and given the option to purchase, borrow, lease, etc. the companion audio content when the user currently does not have rights to listen to the audio content. Companion audio content may be retrieved from storage on the synchronization device 104 or from a remote source, such as content data store 208. Similarly, the identity of the physical content may be determined by the synchronization device 104, rather than the content detection and alignment server 206.

At block 506, the synchronization device 104 may be used to detect the current page and/or a page turn. This may be accomplished in a manner similar to the physical content identification described above. The camera 112 or a sensor may be used to detect a page turn, or the presence of content on the current page of the physical book. At block 508, an image of the page is captured by the camera 112, again in a manner similar to that described above. The image of the page is processed at block 510 such that the specific portion of content is detected, identified, and the locations and/or coordinates of, e.g., words, on the page are determined. The processing of the page image may be accomplished on the synchronization device 104, and/or on the content detection and alignment server 206.

It will be appreciated that specific portion of physical content that is identified will correspond to a specific portion of the companion audio content that will be synchronously played back for the current page. Thus, at block 512 the specific portion of the physical content and corresponding specific portion of the companion audio content are aligned such that specific portion of physical content may be illuminated or otherwise identified by the synchronization device 104 as the device 104 synchronously outputs the corresponding portion of companion audio content. Specific details concerning the alignment of audio and physical content are disclosed in the '483 application, the '324 Publication, and the '720 Publication, each of which was previously incorporated by reference.

At block 514, a visual cue to the physical content and the companion audio content are synchronously presented to the user. For example, the audio content is played through the speaker 120 of the synchronization device 104 as the corresponding words are synchronously illuminated or otherwise identified on the page of the physical book with a visual cue. When the end of the page is reached, playback of the audio content may be paused or suspended, and the user may be prompted visually and/or aurally to turn the page. For example, the synchronization device 104 may highlight the page number at the bottom or top of the page when the end of the page is reached. Accordingly, a page turn may be detected again at block 506, and the process depicted in FIG. 5 may repeat for the next page of physical content.

Thus, pages of physical content may be processed, and detection and synchronization information may be generated, in real-time, or near real-time, as the user turns the pages of the physical content. Additionally, the physical content may be illuminated or otherwise identified during synchronous presentation of corresponding digital content without preprocessing the physical content in its entirety.

Figure 6:
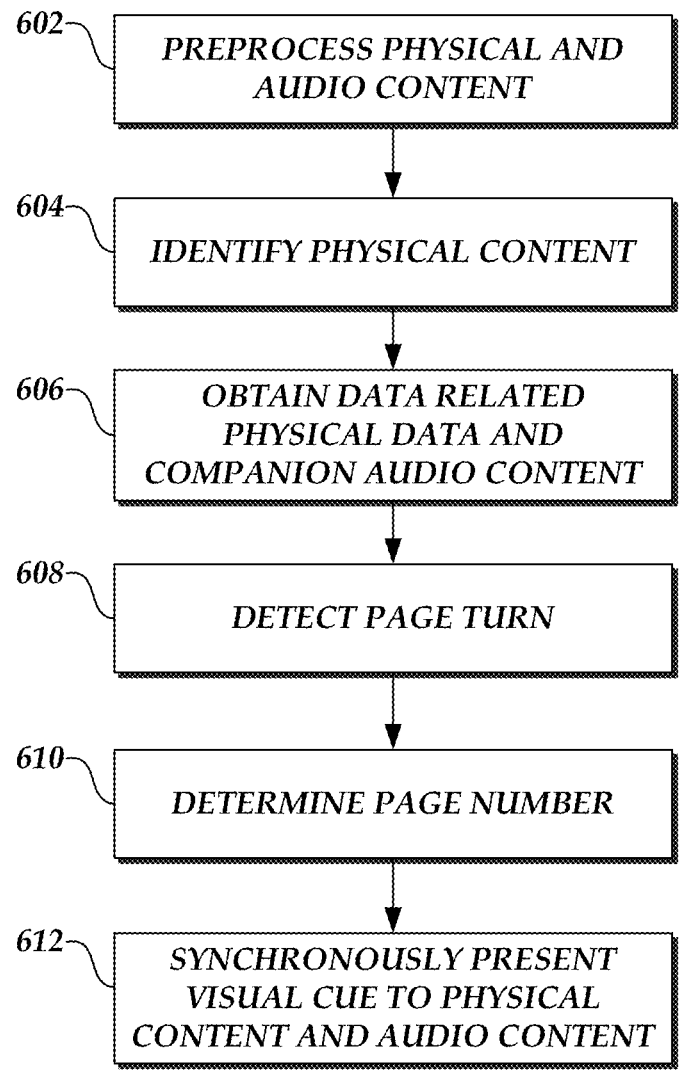
FIG. 6 is a flow diagram depicting another illustrative operation of the content playback synchronization system, according to an embodiment of the present disclosure.

FIG. 6 is a flow diagram depicting another illustrative operation of the content playback synchronization system according to another embodiment of the present disclosure. As with FIG. 5 above, the illustrative operation of FIG. 6 may be carried out by, for example, execution of the content detection and alignment module 316, among other possibilities disclosed above.

At block 602, physical and audio content are preprocessed at the content detection and alignment server 206. In this embodiment, a library of audio content and electronic copies or versions of physical content may be preprocessed before or after a request is made by user. For example, images of all the pages of a specific book may be captured (e.g., via rapid scanning) and processed, and content detection and/or synchronization information may be obtained for each page of the book. Alternatively, the content playback synchronization system may make use of preexisting data stores of physical content scans and synchronization information. For example, book page scans are available from a number of online service providers. Additionally, audio content may be synchronized with the captured page images. Thus, in this embodiment physical content may be processed before, instead of after, a page turn is detected. This has the advantage of potentially speeding up synchronous presentation of audio content and a visual due to physical content following a page turn.

At block 604, the identity of the physical content is determined in a manner similar to that described in block 502 of FIG. 5. At block 606, data related to the physical content and its companion (or corresponding) audio content are obtained. Data related to the physical content may include, for example, content detection information and/or synchronization information determined during the preprocessing of the physical content. In an embodiment, content detection information and/or synchronization information are obtained by the synchronization device 104 from the content detection and alignment server 206. Alternatively, if preprocessing took place on synchronization device 104, content detection information and/or synchronization information may already be present in the memory of the synchronization device 104.

At block 608, a page turn may be detected in a manner similar to that described above in block 506 of FIG. 5. At block 610, the current page number is determined so that the synchronization device 104 may retrieve the content detection information and/or synchronization information related to the preprocessed physical content and the corresponding companion audio content. Alternatively, the page number may be detected and may be linked to the corresponding audio content. At block 612, a visual cue to the physical content and the companion audio content are synchronously presented to the user based on the content detection information and/or synchronization information, as described above.

In some embodiments, the synchronization device 104 may provide a visual cue by obscuring physical content that does not correspond to the audio content synchronously being presented. For example, the synchronization device 104 may block all the physical content from the user's view, with the exception of the illuminated portion that (such as a word) that corresponds to the audio content synchronously being presented. Obscuring of content may be accomplished by, for example, illuminating the specific portion of physical content while the user reads in the dark, or using a different colored light or laser to obscure the portions that are not subject to synchronous presentation.

In another embodiment, the synchronization device 104 may be embodied in glasses or a headset worn by the user and the visual cue may be provided through the glasses or headset. For example, the visual cue may be produced on the lens or lenses of the glasses in the user's line of sight. Thus, the user may perceive the visual cue identifying the specific portion of physical content subject to synchronous presentation. Alternatively, the glasses may obscure the portions of the physical content with the exception of the illuminated portion that is subject to the synchronous presentation.

In yet another embodiment, the synchronization device 104 may be used without companion audio content. For example, the synchronization device 104 may provide a visual cue sequentially identifying words, phrases, or sentences (among other possibilities) at a speed set by a user. The visual cue may thus advantageously help a user read a book at a constant pace, or help the user read at a faster pace. Accordingly, the synchronization device 104 may replace a user's finger to guide reading while practicing a speed reading method. Alternatively, the visual cue may move down the side or margin of the page. Alternatively, the synchronization device 104 may include an audio detection module so that the content synchronization device 104 may provide a visual cue to the physical content that is synchronized with the user reading the physical content aloud.

In another embodiment, the synchronization device 104 may track the eye movements of the user as the user reads the physical content, synchronizing corresponding audio content output with the location of the user's gaze on the physical content.

In yet another embodiment, the synchronization device 104 may be used with a physical book having blank pages. In this embodiment, the synchronization device may project or draw words onto the blank pages of the physical book. The words may be updated as the user turns the pages of the book. Content may be highlighted (or another visual cue may be provided) synchronously with playback of companion audio content or may be highlighted without such playback.

While the disclosure herein discusses examples of synchronously presenting content for illustrative purposes, the principles and advantages described herein may be applied to other ways of synchronizing content. Any combination of features described herein may be applied to other forms of content synchronization, as appropriate. For example, content synchronization information can be used to switch back and forth between presenting audio content and textual content (in embodiments where textual content is presented by the synchronization device 104). More specifically, in some embodiments, a computing device may display the text of an electronic book and then switch to playing the audio of an audio book at a corresponding position using the content synchronization information. As another example, the principles and advantages described herein can be used to synchronize companion content on different computing devices outside the context of synchronously presenting companion content. For instance, any combination of features described herein can be applied to any of the examples of synchronizing content on different computing devices described in the '324 Publication, the '998 Publication, the '483 application, and the '720 Publication, each of which were incorporated by reference in their entireties above.

Thus, a user of the content playback synchronization system may advantageously read a physical book while simultaneously listening to a companion audio book. Advantageously, words and other content in the physical book may be synchronously highlighted as the audio book is played back, obviating the need for manual synchronization of content.

Depending on the embodiment, certain acts, events, or functions of any of the processes or algorithms described herein may be performed in a different sequence, may be added, may be merged, and/or may be left out altogether (for example, not all described operations or events are necessary for the practice of the process or algorithm). Moreover, in certain embodiments, operations or events may be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The steps of a method, process, routine, or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of a non-transitory computer-readable storage medium. An example storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   under control of one or more computing devices configured with specific computer executable instructions,
      causing output of a first portion of a plurality of portions of digital content via a computing device, wherein the digital content corresponds to physical content;
      causing a user perceptible cue source to output a user perceptible cue on the physical content at a first position in the physical content corresponding to the first portion of the digital content; and
      maintaining synchronous output of the digital content and the user perceptible cue on the physical content based at least in part on content synchronization information that associates each portion of the plurality of portions of the digital content with a respective position in the physical content.

2. The computer-implemented method of claim 1, wherein maintaining synchronous output of the digital content and the user perceptible cue on the physical content comprises:
   causing output of a second portion of the plurality of portions of the digital content; and
   causing the user perceptible cue source to output the user perceptible cue on the physical content at the respective position in the physical content that is associated, by the content synchronization information, with the second portion of the digital content.

3. The computer-implemented method of claim 2, further comprising:
   under control of the one or more computing devices configured with specific computer executable instructions,
      detecting an end of a section of the physical content;
      determining that the user perceptible cue is output on the physical content at a position in the physical content that corresponds to the end of the section of the physical content; and
      suspending output of the digital content.

4. The computer-implemented method of claim 1, wherein the digital content comprises at least one of an audio book, a song, a video, a television program, a video game, or a movie.

5. The computer-implemented method of claim 1, wherein the physical content comprises at least one of a book, a newspaper, a magazine, a newsletter, or a computing device displaying content.

6. The computer-implemented method of claim 1, wherein the user perceptible cue is at least one of a visual cue or a tactile cue.

7. The computer-implemented method of claim 6, wherein the user perceptible cue is a visual cue comprising at least one of an underline, a box, a circle, a cursor, or a highlight.

8. The computer implemented method of claim 6, wherein the user perceptible cue is a tactile cue comprising at least one of electrical pulses or thermopneumatic actuators.

9. The computer-implemented method of claim 1, further comprising:
   under control of the one or more computing devices configured with specific computer executable instructions,
      identifying the physical content by at least one of a cover, a title page, an ISBN, a barcode, an embedded electronic device, a format, or a unique identifier; and
      retrieving the digital content corresponding to the physical content based on the identification of the physical content.

10. The computer-implemented method of claim 1, wherein the corresponding digital content comprises captured audio of a user reading the physical content.

11. A device for synchronizing physical content with the output of corresponding content, the device comprising:
    a user perceptible cue source configured to output a user perceptible cue on portions of physical content;
    a content output device configured to output electronic content that corresponds to the physical content; and
    a processor in communication with the content output device and the user perceptible cue source, the processor operative to:
       cause the content output device to output a portion of the electronic content;
       identify, based at least in part on content synchronization information, a portion of the physical content corresponding to the portion of the electronic content output by the content output device; and
       cause the user perceptible cue source to output a user perceptible cue on the portion of the physical content corresponding to the portion of the electronic content output by the content output device.

12. The device of claim 11, wherein the processor is further operative to:
cause the content output device to output a next portion of the electronic content;
identify, based at least in part on the content synchronization information, a next portion of the physical content corresponding to the next portion of the electronic content output by the content output device; and
cause the user perceptible cue source to output the user perceptible cue on the next portion of the physical content corresponding to the next portion of the electronic content output by the content output device.

13. The device of claim 11, wherein the user perceptible cue source identifies the portion of the physical content by least one of underlining the portion of the physical content, boxing the portion of the physical content, circling the portion of the physical content, pointing to the portion of the physical content, illuminating the portion of the physical content, or obscuring another portion of the physical content.

14. The device of claim 13, wherein the portion of the physical content comprises at least one of a word, a syllable, a phoneme, a morpheme, a letter, a sentence, a line, a paragraph, a chapter, a stanza, a section, a column, a picture, a table, or an equation.

15. The device of claim 11, further comprising:
an image capture device configured to capture images of the physical content,
wherein the processor is in communication with the image capture device, and wherein the processor is further operative to:
cause the image capture device to capture an image of a section of the physical content; and
determine content detection information based at least in part on the captured image of the section of the physical content.

16. The device of claim 15, wherein the processor is further operative to determine at least one of word boundaries, word identities, or spatial coordinates of words.

17. The system of claim 15, wherein the processor is further operative to:
identify the physical content by at least one of a captured cover, a captured title page, a captured ISBN, a captured barcode, an embedded electronic device, a captured format, or a unique identifier; and
retrieve the electronic content based on the identification of the physical content.

18. The device of claim 11, wherein the electronic content comprises at least one of analog content and digital content.

19. A computer-readable, non-transitory storage medium having at least one computer-executable component for synchronizing output of digital content with corresponding physical content, the at least one computer-executable component comprising:
a content synchronization module operative to:
cause output of a first portion of digital content via a computing device, wherein the digital content corresponds to physical content;
cause a user perceptible cue source to output a user perceptible cue on the physical content at a first position in the physical content, wherein the first position in the physical content corresponds to the first portion of the digital content; and
maintain synchronous presentation output of the digital content and the user perceptible cue on the physical content based at least in part on content synchronization information that associates each portion of a plurality of portions of the digital content with a position in the physical content.

20. The computer-readable, non-transitory storage medium of claim 19, wherein the content synchronization module is operative to maintain synchronous output of the digital content and the user perceptible cue by:
causing output of a second portion of the digital content;
obtaining, from the content synchronization information, a second position in the physical content that is associated with the second portion of the digital content; and
causing the user perceptible source cue to output the user perceptible cue on the physical content at the second position in the physical content obtained from the content synchronization information.

21. The computer-readable, non-transitory storage medium of claim 20, wherein the content synchronization module is further operative to:
cause an image capture device to capture an image of the physical content;
detect an end of a section of the physical content based at least in part on the captured image;
determine that the second position in the physical content corresponds to the end of the section of the physical content; and
suspend output of the digital content.

22. The computer-readable, non-transitory storage medium of claim 21, wherein the content synchronization module is further operative to:
detect a page turn, wherein the content synchronization information is determined after the page turn is detected.

23. A system for providing content synchronization information, the system comprising:
a data store that stores content information and content synchronization information;
one or more configured computing devices in communication with the data store that are operative to:
receive, from a device, an image of a section of physical content, wherein the device is configured to:
capture images of physical content,
output digital content, and
output a user perceptible cue on the physical content using synchronization information associated with both the physical content and the digital content;
identify the physical content from the image of the section of the physical content;
retrieve digital content corresponding to the identified physical content from the content information in the data store;
retrieve synchronization information from the content synchronization information in the data store, the synchronization information associated with both the physical content and the digital content; and
cause transmission of the digital content and the synchronization information from the data store to the device via a network.

24. The system of claim 23, wherein the one or more configured computing devices are further operative to:
determine content detection information from the image of the section of the physical content; and
cause transmission of the content detection information to the device via the network, wherein the content detection information comprises at least one of: word boundaries, word identities, and spatial coordinates of words.

* * * * *